United States Patent
Gedenk et al.

(10) Patent No.: US 8,047,139 B2
(45) Date of Patent: Nov. 1, 2011

(54) RAILWAY BOGIE

(75) Inventors: Volker Gedenk, Hemmingen (DE);
Gilles Metenier, Bures sur Yvette (FR);
John Skiller, AK Soest (NL)

(73) Assignee: Contitech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 11/971,135

(22) Filed: Jan. 8, 2008

(65) Prior Publication Data
US 2008/0229968 A1   Sep. 25, 2008

Related U.S. Application Data

(63) Continuation of application No. 10/594,086, filed as application No. PCT/EP2004/003199 on Mar. 26, 2004, now abandoned.

(51) Int. Cl.
*B61F 5/26* (2006.01)
(52) U.S. Cl. .................................................. 105/218.1
(58) Field of Classification Search .................. 105/213, 105/218.1, 218.2, 219, 224.05, 453, 172
See application file for complete search history.

(56) References Cited

U.S. PATENT DOCUMENTS

| | | | | |
|---|---|---|---|---|
| 2,074,489 A | * | 3/1937 | De Los Rice | 105/222 |
| 2,941,482 A | * | 6/1960 | Furrer | 105/169 |
| 3,062,328 A | * | 11/1962 | Butler | 188/33 |
| 3,399,634 A | * | 9/1968 | Zunich | 105/224.05 |
| 3,841,232 A | * | 10/1974 | Hess | 105/224.05 |
| 3,920,231 A | | 11/1975 | Harrison et al. | |
| 4,166,611 A | | 9/1979 | Geers et al. | |
| 4,676,172 A | * | 6/1987 | Bullock | 105/168 |
| 5,611,284 A | * | 3/1997 | Smith et al. | 105/220 |
| 2002/0089102 A1 | * | 7/2002 | Gedenk | 267/140.13 |
| 2007/0175356 A1 | | 8/2007 | Gedenk et al. | |

FOREIGN PATENT DOCUMENTS

| | | |
|---|---|---|
| AU | 2003204401 A1 | 12/2003 |
| CN | 87 2 04310 U | 2/1988 |
| CN | 22 4 2210 Y | 12/1996 |
| CN | 23 7 5534 Y | 4/2000 |
| DE | 1 230 834 B | 12/1996 |
| DE | 60009038 A1 | 11/2004 |
| EP | 1057707 T2 | 12/2000 |
| EP | 1 369 616 | 12/2003 |
| EP | 1 369 616 A1 | 12/2003 |
| GB | 874728 | 8/1961 |
| GB | 874728 A | 8/1961 |
| GB | 8747278 A | 8/1961 |
| JP | 10-148233 | 6/1998 |

(Continued)

OTHER PUBLICATIONS

CCPIT Official Action dated Jul. 29, 2008 with English Translation.

(Continued)

*Primary Examiner* — Joe Morano, IV
*Assistant Examiner* — Robert J. McCarry, Jr.
(74) *Attorney, Agent, or Firm* — Buchanan Ingersoll & Rooney PC

(57) ABSTRACT

A railway bogie includes at least two spring units per one wheel, a bogie frame and an essentially single piece adapter which bridges the spring units and is arranged between the spring units on the one side and the bogie frame on the other side.

15 Claims, 2 Drawing Sheets

FOREIGN PATENT DOCUMENTS

| | | |
|---|---|---|
| JP | 11-94008 | 4/1999 |
| JP | 11-94012 | 4/1999 |
| JP | 2002-362362 | 12/2002 |
| JP | 2003-327120 | 11/2003 |

OTHER PUBLICATIONS

English Translation of Notification of Reasons for Rejection issued in corresponding Japanese Application No. 2007-504261 dated Sep. 1, 2009.

* ContiTech Luftfedersystem GmbH in Hannover, Germany, "Air Spring Systems for Modern Rail Vehicles", printed and distributed in Oct. 1998, 20 pages. This document is mentioned on p. one of the present application.

Official Action issued by the Chinese Patent Office in corres. CN Patent Appln. 200480042577.3, Sep. 14, 2007; and English-language translation thereof.

* cited by examiner

RAILWAY BOGIE

FIELD OF THE INVENTION

The invention relates to a railway bogie comprising at least two spring units per one wheel and a bogie frame.

BACKGROUND DISCUSSION

From UIC standard a bogie with helical springs is well known in which the axlebox suspension consists of helical springs in combination with friction damping. The springs rest on support arms integral with the lower part of the axlebox housing and are connected with the bogie frame using caps integral with the bogie frame for taking up the top of the springs.

US 2002-0089 102 A1 discloses a hydraulic spring comprising a membrane. This document discloses that the hydraulic spring is for use in rail vehicles especially as a primary spring.

Further, the catalogue of the company ContiTech Luftfedersysteme GmbH in Hannover, Germany, "Air Spring Systems for Modem Rail Vehicles", printed and distributed in October 1998, discloses the use of hydraulic springs comprising a membrane in two-axle bogies.

One object of the present invention is to provide an improved railway bogie comprising at least two spring units per one wheel and a bogie frame, so that various types of spring units in connection with also various types of axleboxes having all diverse dimensions can be connected to the bogie frame having standardized dimensions in an easy and reliable manner.

SUMMARY

A railway bogie comprises at least two spring units per one wheel, a bogie frame, and an essentially single piece adapter which bridges the spring units and is arranged between the spring units on the one side and the bogie frame on the other side.

The adapter is used in an advantageous manner to adapt various types of spring units in connection with various types of axleboxes having all diverse dimensions to the bogie frame having standardized dimensions without the need of modifying the bogie frame. Just the adapter is modified according to the used type of spring units and axlebox, whereby any modifying of the adapter can be done more easily and in a more cost-efficient way than it could be done with the bogie frame itself.

With the accurately pre-fabricatable adapter it can further be assured that the two spring units are mounted to the bogie frame exactly with a prescribed distance between the principal axes of the two spring units, whereby every deviation from the prescribed distance would result in a tangential deviation of the spring units and therewith in an undesirable modification of the spring characteristic.

BRIEF DISCUSSION OF THE DRAWING FIGURES

Further advantages, features and details of the invention are described with respect to one preferred embodiment of the invention with reference to the accompanying drawings briefly described below.

DETAILED DESCRIPTION

Figure 1:
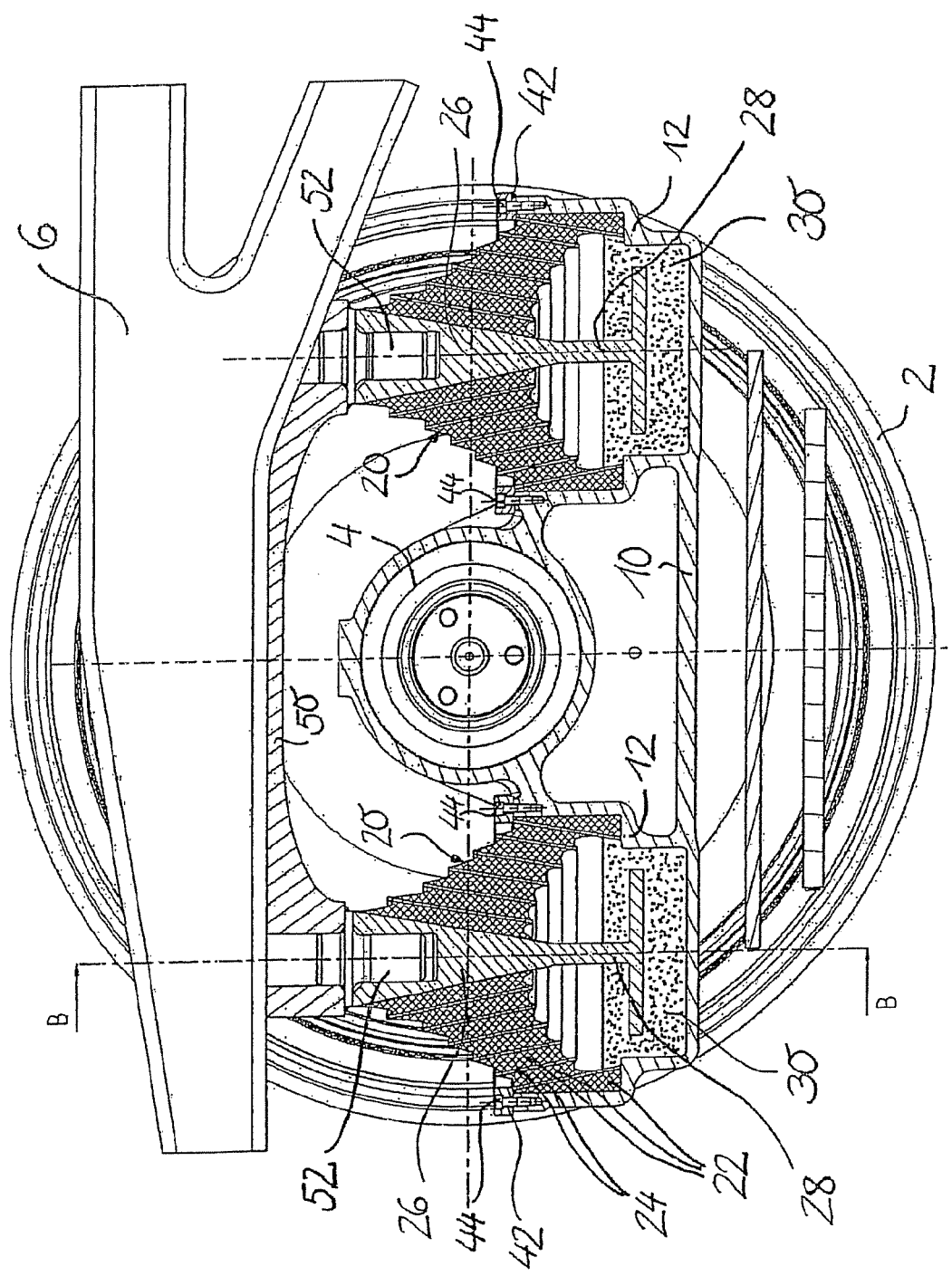
FIG. 1 is a longitudinal cross section in the region of one wheel of a bogie.

FIG. 1 shows a longitudinal cross-section in the region of one wheel 2 of a bogie of the so-called Y 25 type, whereby the cut is directed according to a plane being defined by the axes of rotational symmetry of a first and second hydraulic spring. The pictured section of the bogie comprises an axlebox 10 with a rolling bearing 4 mounted in a middle region of the axlebox 10. The rolling bearing 4 supports one end of one of the two axles of the bogie.

A base of the axlebox 10 is extended to the left and the right side forming a cup shaped region 12 at each of the sides. Each of the hydraulic springs comprises a spring element 20 which is attached to each of the cup shaped regions 12 of the axlebox 10. A metallic centerpiece 26 is located in the center of each of the spring elements 20.

These two centerpieces 26 are attached to one bridging adapter 50. Therefore the centerpieces 26 and the bridging adapter 50 have bores for connecting the centerpieces 26 with the bridging adapter 50 via two bolts 52 pictured uncut in FIGS. 1 and 2. In other embodiments, the bolts 52 can be integral parts of the centerpieces 26 or of the bridging adapter 50 or the centerpieces 26 can be connected to the bridging adapter 50 by any other connecting means.

The bridging adapter 50 is attached to a longeron of a frame 6 of the bogie. This longeron extends in a longitudinal direction parallel to the rails and is pictured uncut in FIG. 1. Preferably the bridging adapter 50 is connected to the bogie frame 6 by welding.

Figure 2:
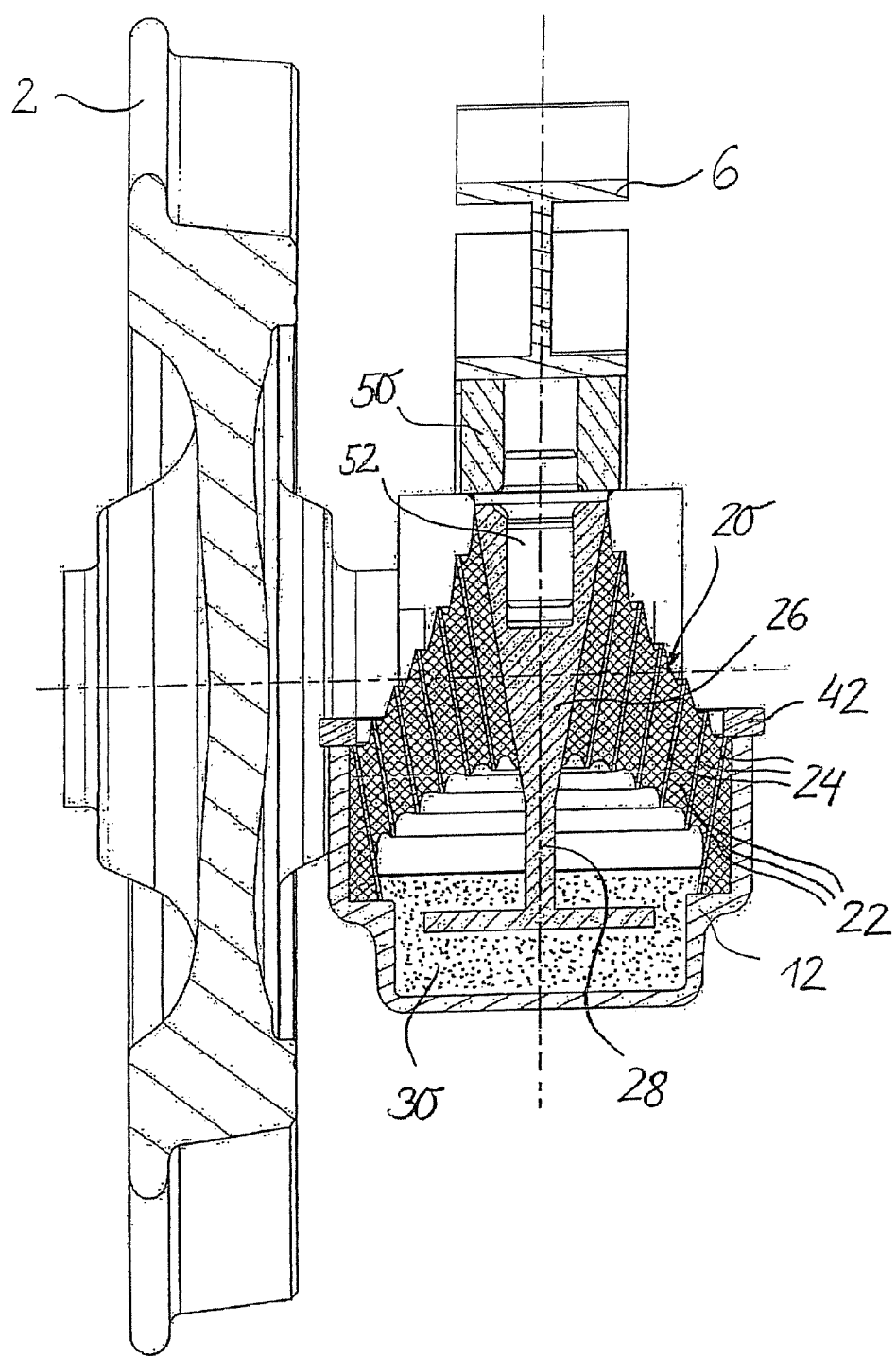
FIG. 2 is a sectional view along the line B-B of FIG. 1.

In the following description, just the left cup shaped region 12 in connection with the left spring element 20 is described in detail, because the same applies to the right cup shaped region 12 in connection with the right spring element 20. FIG. 2 shows a sectional view along the line B-B of FIG. 1. The spring element 20 comprises sleeve shaped elastomeric elements 22 and intermediate sleeve shaped metallic elements 24 in an alternating succession, whereby the elastomeric and the metallic elements 22 and 24 are connected by way of vulcanization. Also the centerpiece 26 is connected by way of vulcanization to its adjacent elastomeric element 22.

The spring element 20 is secured to the respective cup shaped region 12 of the axlebox 10 via a sealing ring 42, which is attached to the axlebox 10 via screws 44. In other embodiments the spring element 20 also can be directly vulcanized to the cup shaped region 12. The spring elements 20 forms together with the respective cup shaped region 12 of the axlebox 10 a volume for a fluid 30, particularly a hydraulic fluid. This volume is at least partly filled with the fluid 30. The centerpiece 26 is prolonged into the volume forming a plunger shaped region 28. Thereby at least a disk shaped region at the end of the plunger shaped region 28 is dipped into the fluid 30, so that this arrangement fulfils the function of a damper. The cup shaped region 12 of the axlebox 10 together with the respective spring element 20 and the fluid 30 form together the hydraulic spring.

In another embodiment of the invention, a hydraulic spring can be used, e.g. according to the already cited US 2002-0089102 A1, comprising a membrane instead of the plunger shaped section 28 of the centerpiece 26, whereby the cup shaped region 12 of the axlebox 10 is then also one part of the housing of the hydraulic spring.

The invention claimed is:

1. Adapter arrangement of a railway bogie comprising at least two spring units per one wheel, a bogie frame, and a single piece adapter which bridges said spring units and is arranged between said spring units on the one side and said bogie frame on an other side, wherein the spring units have parallel longitudinal axes, and wherein the bridging adapter is immovably fixed to the bogie frame.

2. Adapter arrangement of a railway bogie of claim 1, whereby said bogie is a Y 25 type bogie.

3. Adapter arrangement of a railway bogie of claim 1, whereby at least one of said spring units comprises a hydraulic spring.

4. Adapter arrangement of a railway bogie of claim 1, whereby said adapter is attached to said bogie frame by welding.

5. Adapter arrangement of a railway bogie of claim 1, whereby said adapter is connected to at least one of said spring units via at least one bolt.

6. Adapter arrangement of a railway bogie of claim 5, whereby said bolt is an integral part of said adapter or said spring unit.

7. Adapter arrangement of a railway bogie of claim 1, whereby said adapter has an essentially rectangular cross section.

8. Adapter arrangement of a railway bogie of claim 1, whereby said adapter extends oblong in a direction in which said adapter bridges said spring units.

9. Railway bogie comprising:
an axlebox adapted to be mounted on a wheel;
a bogie frame;
a first spring unit connected to the axlebox;
a second spring unit connected to the axlebox; and
the first and second spring units having parallel longitudinal axes and being connected to a common single piece bridging adapter which bridges the first and second spring units and is immovably fixed to the bogie frame.

10. Railway bogie of claim 9, wherein at least one of the first and second spring units comprises a hydraulic spring.

11. Railway bogie of claim 9, wherein the bridging adapter is connected to the bogie frame by welding.

12. Railway bogie of claim 9, wherein the common bridging adapter is connected to the first and second spring units by respective bolts.

13. Railway bogie of claim 9, further comprising two bolts extending from the common bridging adapter, each bolt being connected to one of the first and second spring units.

14. Railway bogie of claim 9, wherein the common bridging adapter is oblong in a direction in which said bridging adapter bridges the first and second spring units.

15. Railway bogie of claim 9, further comprising a bearing mounted in a middle region of the axlebox.

* * * * *